United States Patent [19]

Ishihara et al.

[11] Patent Number: 5,728,983
[45] Date of Patent: Mar. 17, 1998

[54] ELONGATED TUBE-LIKE PRESSURE SENSITIVE CABLE SWITCH

[75] Inventors: Hidenori Ishihara, Hamamatsu; Tomoyuki Kikuta; Takeshi Tanaka, both of Toyohashi, all of Japan

[73] Assignee: ASMO Co., Ltd., Kosai, Japan

[21] Appl. No.: 699,729

[22] Filed: Aug. 20, 1996

[30] Foreign Application Priority Data

Dec. 27, 1995 [JP] Japan .................. 7-341274

[51] Int. Cl.$^6$ .................. H01H 3/16; H01H 35/00
[52] U.S. Cl. .................. 200/61.43; 200/85 R; 200/86 R
[58] Field of Search .................. 200/61.43, 61.54, 200/61.57, 511, 61.62, 85 R, 86 R, 61.44

[56] References Cited

U.S. PATENT DOCUMENTS

| | | | |
|---|---|---|---|
| 3,710,050 | 1/1973 | Richards | 200/61.43 |
| 4,742,196 | 5/1988 | Kelly | 200/86 R |
| 4,762,970 | 8/1988 | Brinsley | 200/86 R |
| 5,023,418 | 6/1991 | Beckhausen | 200/511 |
| 5,296,658 | 3/1994 | Kramer et al. | 200/61.43 |

FOREIGN PATENT DOCUMENTS

| | | | |
|---|---|---|---|
| 3002849 | 7/1994 | Japan | H01H 13/52 |
| 6-260054 | 9/1994 | Japan | H01H 13/52 |
| 7-7032 | 1/1995 | Japan | H01H 13/52 |
| 7-7033 | 1/1995 | Japan | H01H 13/52 |
| 7-7034 | 1/1995 | Japan | H01H 13/52 |
| 7-7035 | 1/1995 | Japan | H01H 13/52 |
| 7-141958 | 6/1995 | Japan | H01H 13/52 |
| 7-32831 | 6/1995 | Japan | H01H 13/52 |

*Primary Examiner*—J. R. Scott
*Attorney, Agent, or Firm*—Burns, Doane, Swecker & Mathis, LLP

[57] ABSTRACT

A pressure-sensitive cable switch includes a pair of metallic conductors arranged in opposing relation to one another on the neutral axis for bending within the cross section of a rubber tube, and extend in the longitudinal direction of the tube. A pair of belt-shaped electrodes made of conductive rubber material or other conductive materials and embedding the metallic conductors therein, are disposed to oppose each other on the inner circumferential surface of the robe with respect to the neutral axis for bending. The electrodes extend in the longitudinal direction of the tube. Therefore, an erroneous operation of the cable switch at a part where the switch is bent is prevented, and furthermore the cable switch operates while coping with a wide range of load application angles.

5 Claims, 2 Drawing Sheets

ELONGATED TUBE-LIKE PRESSURE SENSITIVE CABLE SWITCH

BACKGROUND OF THE INVENTION

1. Field of the Invention

The present invention relates to a pressure-sensitive cable switch used in a pinching preventive device for an automotive power window and the like, and more particularly relates to a structural improvement of the same.

2. Description of Related Art

A conventional pressure-sensitive cable switch has a tube, such as a rubber tube having flexure, wherein either a pair or a plurality of pairs of belt-shaped electrodes extends in the longitudinal direction thereof. These belt-shaped electrodes are made of conductive rubber material or other conductive materials, and disposed so as to face in opposing relation to each other on the inner circumferential surface of the tube.

As shown in FIG. 3, this kind of pressure-sensitive cable switch S is arranged along the inner peripheral edge of a door frame 5 of a power window. When a foreign object is pinched between a door glass 7 driven to rise to close by a driving motor 6 and the door frame 5, a part of the pressure-sensitive cable switch S is pressed and deformed. As a result, the electrodes come into contact for conduction at that part, thus generating a pinching detection signal.

Here, in order to improve a detection sensitivity of pressure-sensitive cable switch S, it is required to reduce a resistance of the entire belt-shaped electrodes so as to increase a resistance difference between non-conduction and conduction times. Therefore, it is proposed to embed in belt-shaped electrodes a stranded wire or a knitted wire. (JP-A-6-260054 and JP-U-7-7033).

However, in the conventional pressure-sensitive cable switches disclosed in the above-mentioned publications, since a modulus of elasticity of the stranded wire and the like is small compared with those of the tube and the belt-shaped electrodes, a cross-section of the part where the switch S is bent (portion A in FIG. 3) is deformed. Therefore, the cable switches are liable to function erroneously due to an unwanted conduction of the belt-shaped electrodes.

Therefore, in JP-A-7-141958, as shown in FIG. 4, a pressure-sensitive cable switch S is proposed, wherein a pair of belt-shaped electrodes 41 and 42 are disposed in parallel on the same inner circumferential side surface of a tube 44 and stranded wires 45 and 46 are respectively embedded therein, and wherein a belt-shaped electrode 43 for contacting with belt-shaped electrodes 41 and 42 when the tube 44 is pressed and deformed to conduct the same is also disposed on the opposite side of the inner circumferential surface from the belt-shaped electrodes 41 and 42.

However, a pinching load in the power window and the like is hardly applied from the vertical direction (up-down direction in the Figure) towards the pressure-sensitive cable switch S due to a relative positioning relationship with a weatherstrip and so on, but is applied mostly from the diagonal direction. Therefore, the relative positioning of the belt-shaped electrodes 41 and 42 to the electrode 43 is shifted in the horizontal direction, and there is a possibility that electrodes 41 and 42 are not conducted with electrode 43 when the tube 44 is pressed and deformed.

SUMMARY OF THE INVENTION

In light of the above-described problems, the present invention has an object to provide a pressure-sensitive cable switch that does not function erroneously at a position where the switch is bent, but reliably functions coping with a wide range of load-applying angles.

According to the present invention, metallic conductors are respectively arranged on the inner circumferential opposing portions disposed in the vicinity of a neutral axis for bending of a cross-sectional surface of a tube. A pair of belt-shaped electrodes made of conductive rubber material or conductive resinous material, wherein metallic conductors are embedded respectively in edge portions thereof so as to face opposingly each other with respect to neutral axis for bending, extend in the longitudinal direction of the tube.

According to this structure, stress generated in the vicinity of the neural axis for bending is small when the tube is bent. Therefore, even when metallic conductors having a low elasticity modulus are positioned there, the cross section of the tube does not deform largely. Thus, a default causing an erroneous function, induced by a contact of the belt-shaped electrodes, will not occur.

Since the belt-shaped electrodes are disposed to face opposingly on the inner circumferential surface of the tube with respect to neutral axis for bending, even when a pinching load is applied over a wide angle range toward a perpendicular line of the neutral axis for bending to some extent, both belt-shaped electrodes do not shift in the horizontal direction completely, and the belt-shaped electrodes come into contact for conduction in accordance with pressing and deformation of the tube.

Further, when the metallic conductors are arranged on the inner circumferential opposing portions disposed on the neutral axis for bending, the belt-shaped electrodes wherein metallic conductors are embedded in the edge portions thereof are shiftingly arranged each other in the direction of the neutral axis for bending. Therefore, a sure contact and conduction of the both belt-shaped electrodes is guaranteed with respect to the pinching load, which mostly applies with an acute angle toward the direction of the perpendicular line of the neutral axis for bending.

Preferably, expanded portions are extruded from the inner circumferential surface of the tube into a space between the belt-shaped electrodes, so that the surfaces of expanded portions are connected smoothly with the inner circumferential surfaces of the belt-shaped electrodes.

By this structure, since there is no discontinuously stepped part on the inner circumferential surfabe of tube wherein the belt-shaped electrodes are disposed, the stress generated does not concentrate on a particular part of the tube when it is bent. Therefore, a durability of the pressure-sensitive cable switch improves.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

(First Embodiment)

Figure 1:
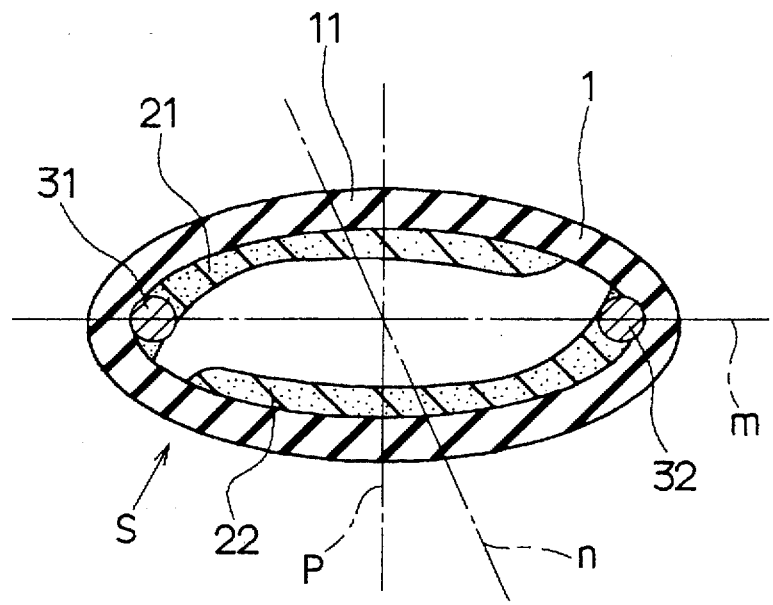
FIG. 1 is a transversal sectional view of a pressure-sensitive cable switch according to a first embodiment of the present invention.
Figure 3:
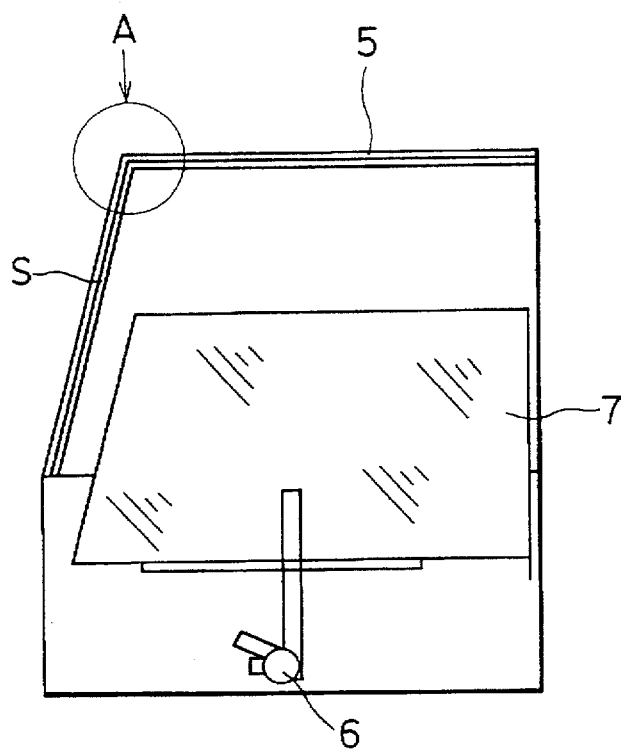
FIG. 3 is a front view of a vehicular door wherein a conventional pressure sensitive cable switch is applied.
Figure 4:
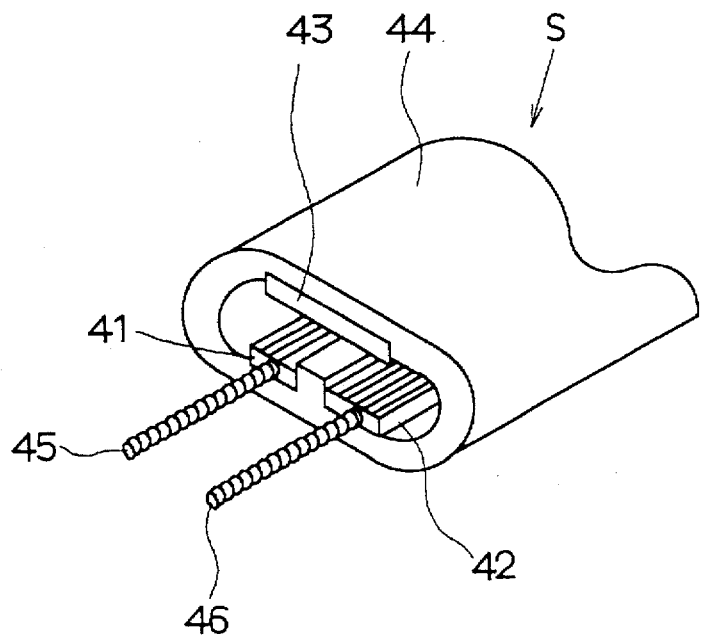
FIG. 4 is a partially-cut perspective view of another conventional pressure sensitive cable switch.

A longitudinal sectional view of a pressure-sensitive cable switch S is shown in FIG. 1. A rubber tube 1 has an oval cross section having a pair of generally flat portions and a pair of corner portions between the flat portions, and a longitudinal axis of the cross section functions as a neutral axis m for bending. That is, an upper cross-sectional side 11 of the pressure-sensitive cable switch S is fixed to an inner peripheral edge of a door frame 5 (FIG. 3) extending along the same, and a part thereof is bent along the door frame 5 (Part A in FIG. 3).

In this case, a tensile stress is generated in the upper half of the cross section from the neutral axis m for bending, whereas a compressire stress is generated in the lower half of the cross section from the same, for example. There is, however, no stress generated actually in opposing portions disposed at the right and left ends on the neutral axis m for bending. Therefore, metallic conductors 31 and 32 made of either a single, stranded, or knitted electric wire are arranged in the longitudinal direction of the tube 1, i.e., at the right and left corner portions of tube 1. Conductors 31 and 32 are electrically insulated from each other and connected to a voltage source not shown in the Figure.

Metallic conductor 31 on the left is embedded in the left edge portion of the electrode 21 made of conductive rubber material or conductive resinous material and having a flat cross section. Electrode 21 is in electrical conduction with conductor 31 and is joined to the left side of the inner circumferential surface of tube 1 as well as to most of the upper side of the same, and extends in the longitudinal direction of the tube 1 keeping the same belt width.

Metallic conductor 32 on the right is also embedded in the right edge portion of electrode 22 made of conductive rubber or other conductive materials having a flat cross section. Electrode 22 is in electrical conduction with the conductor 32 and joined to the right side of the inner circumferential surface of the tube 1 as well as to most of the lower side of the same by way of extrusion and the like, keeping a space for electrical insulation from the belt-shaped electrode 21.

By using a pressure-sensitive cable switch S having the above-mentioned structure, even when the rubber tube 1 is bent halfway, since there is no stress generated in the parts wherein the metallic conductors 31 and 32 are embedded, the cross section of the rubber tube 1 will not deform to a large extent. Thus, there is no possibility that the belt-shaped electrodes 21 and 22 will come into contact for conduction resulting in an erroneous operation.

A line n connecting the center points of the upper and lower belt-shaped electrodes 21 and 22 makes an angle against a perpendicular line p of the cross section as shown in FIG. 1. Thus, the direction to which the pinching load applies and the direction of line n substantially coincide, if the left side part of the tube 1 is located at a vehicle compartment side. Therefore, both electrodes 21 and 22 come into contact for conduction. In this instance, even if the direction to which the pinching load applies varies more or less, the electrodes 21 and 22 are never shifted largely for the both electrodes 21 and 22 to lose opposing portions completely. As a result, both electrodes 21 and 22 come into contact for conduction to provide a pinching detection signal, wherever the rubber tube 1 is pressed and deformed at.

(Second Embodiment)

Figure 2:
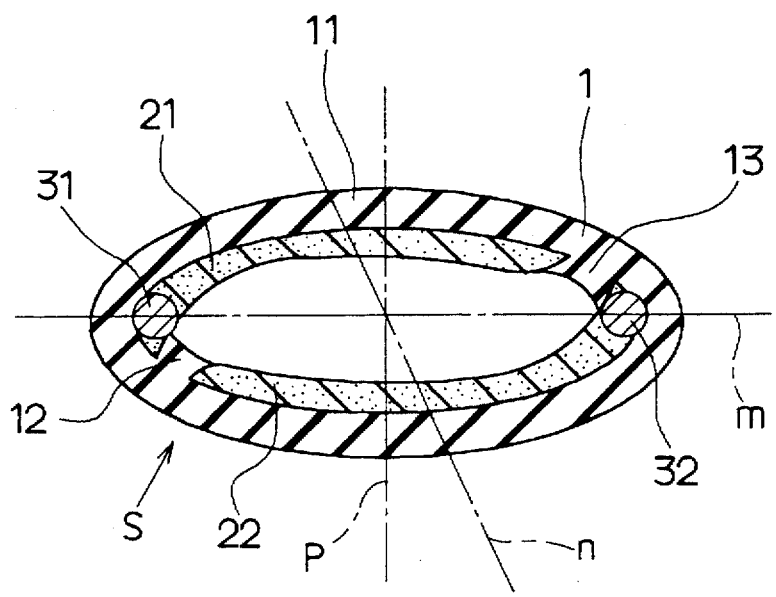
FIG. 2 is a transversal sectional view of a pressure-sensitive cable switch according to a second embodiment of the present invention.

As shown in FIG. 2, an inner wall of a rubber tube 1 is expanded partly to form expanded portions 12 and 13 and fill a peripheral space between lateral edges of upper and lower belt-shaped electrodes 21 and 22. As a result, surfaces of the expanded portions 12 and 13 are smoothly continued to the inner circumferential surfaces of each electrode 21 and 22 without being hampered by any steps.

According to this structure, since stresses generated do not concentrate on one part of the rubber tube 1 when it is bent halfway, a durability of the pressure-sensitive cable switch S is further improved.

Although the present invention has been fully described in connection with the preferred embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A pressure-sensitive cable switch comprising:
   a tube having flexure;
   a pair of metallic conductors extending in a longitudinal direction of said tube, said metallic conductors being disposed opposite each other and each being disposed on a neutral axis for bending of said tube, said neutral axis being generally perpendicular to a direction of application of a load; and
   a pair of belt-shaped electrodes made of conductive material and disposed in opposing relation on an inner circumferential surface of said tube, said electrodes extending in said longitudinal direction and opposing each other with respect to said neutral axis for bending.

2. A pressure-sensitive cable switch according to claim 1, wherein:
   a part of said inner circumferential surface of said tube is expanded into an inner space between edges of said pair of belt-shaped electrodes so as to connect said part of said inner circumferential surface with inner circumferential surfaces of said belt-shaped electrodes continuously and smoothly.

3. A pressure-sensitive cable switch comprising:
   flexible tube made of an electrically insulating material and shaped in a generally oval cross-sectional form having first and second generally flat portions opposing each other, and first and second corner portions opposing each other and joining said flat portions;
   first and second flexible electrodes electrically insulated from each other and joined to an inside surface of said flexible tube to extend longitudinally, said first electrode covering substantially said first corner portion and said first flat portion, and said second electrode substantially covering said second corner portion and said second flat portion;
   a first metallic conductor embedded in said first electrode in electrical conduction therewith at a position around said first corner portion; and
   a second metallic conductor embedded in said second electrode in electrical conduction therewith at a position around said second corner portion.

4. A pressure-sensitive cable switch according to claim 3, wherein:
   said flexible tube has first and second expansion portions extending inwardly to fill lateral spaces between edges of said first electrode and said second electrode.

5. A pressure-sensitive cable switch according to claim 3, wherein:
   said flexible tube is mounted on a vehicle door frame with said first corner portion being located toward a vehicle compartment.

* * * * *